US009751569B2

(12) United States Patent
Ayuzawa et al.

(10) Patent No.: US 9,751,569 B2
(45) Date of Patent: Sep. 5, 2017

(54) AUTOMOBILE BODY STRUCTURE (71) Applicant: HONDA MOTOR CO., LTD., Minato-ku, Tokyo (JP)

(72) Inventors: Shotaro Ayuzawa, Wako (JP); Yoshikazu Shirai, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/127,629

(22) PCT Filed: Dec. 15, 2014

(86) PCT No.: PCT/JP2014/083107
§ 371 (c)(1),
(2) Date: Sep. 20, 2016

(87) PCT Pub. No.: WO2015/145891
PCT Pub. Date: Oct. 1, 2015

(65) Prior Publication Data
US 2017/0137066 A1    May 18, 2017

(30) Foreign Application Priority Data
Mar. 25, 2014  (JP) ................................. 2014-062154

(51) Int. Cl.
*B62D 25/04* (2006.01)
*B62D 25/06* (2006.01)
(Continued)

(52) U.S. Cl.
CPC ........... *B62D 25/04* (2013.01); *B62D 21/157* (2013.01); *B62D 25/025* (2013.01); *B62D 25/06* (2013.01);
(Continued)

(58) Field of Classification Search
CPC ............................... B62D 25/04; B32B 15/14
(Continued)

(56) References Cited

U.S. PATENT DOCUMENTS

| 7,735,906 | B2 * | 6/2010 | Takahashi | B62D 25/04 296/187.02 |
| 8,888,169 | B2 * | 11/2014 | Howe | B32B 15/14 296/187.01 |
| 9,022,458 | B2 * | 5/2015 | Hasegawa | B62D 29/043 296/191 |
| 9,381,943 | B2 * | 7/2016 | Kang | B62D 21/157 |

(Continued)

FOREIGN PATENT DOCUMENTS

| JP | H04-254262 A | 9/1992 |
| JP | 2005-007949 A | 1/2005 |

(Continued)

OTHER PUBLICATIONS

Office Action (Decision of Granting a Patent) issued in a corresponding Japanese Patent Application No. 2016-509911 and dated Jun. 7, 2017.

*Primary Examiner* — Pinel Romain
(74) *Attorney, Agent, or Firm* — Carrier Blackman & Associates, P.C.; Joseph P. Carrier; William D. Blackman (57) ABSTRACT

In an automobile body structure, since a center pillar connecting a side sill and a roof side rail is formed from a pair of CFRP laminates that oppose each other on the inside and the outside in the vehicle width direction and a plurality of metal plates that join the pair of CFRP laminates in the vehicle width direction so as to form a closed cross-section, a compressive load and a tensile load acting on the vehicle width direction inner face and the vehicle width direction outer face of the center pillar when the collision load of a side collision is inputted can be supported by carbon fibers of the pair of CFRP laminates, and out of plane deformation of a front face and a rear face of the center pillar, which is difficult to support with the CFRP laminate, can be prevented by the metal plate.

10 Claims, 6 Drawing Sheets

(51) Int. Cl.
*B62D 25/02* (2006.01)
*B62D 29/04* (2006.01)
*B62D 21/15* (2006.01)
*B62D 25/20* (2006.01)

(52) U.S. Cl.
CPC ....... *B62D 25/2036* (2013.01); *B62D 29/043* (2013.01)

(58) Field of Classification Search
USPC .............................. 296/193, 187.12, 187.01
See application file for complete search history.

(56) References Cited

U.S. PATENT DOCUMENTS

| | | | |
|---|---|---|---|
| 9,630,652 B2* | 4/2017 | Balur | B62D 25/04 |
| 2008/0036235 A1* | 2/2008 | Ameloot | B62D 25/04 |
| | | | 296/102 |
| 2010/0038928 A1* | 2/2010 | Onuma | B62D 25/04 |
| | | | 296/187.12 |
| 2010/0264681 A1* | 10/2010 | Rori | B60N 2/3013 |
| | | | 296/24.43 |
| 2011/0101734 A1* | 5/2011 | Gunther | B62D 25/04 |
| | | | 296/193.06 |

FOREIGN PATENT DOCUMENTS

| | | |
|---|---|---|
| JP | 2006-200702 A | 8/2006 |
| JP | 2006-282099 A | 10/2006 |
| JP | 2007-216754 A | 8/2007 |
| JP | 2013-123873 A | 6/2013 |
| JP | 2013-193637 A | 9/2013 |

* cited by examiner

(A) TOP VIEW (B) BOTTOM VIEW

AUTOMOBILE BODY STRUCTURE

TECHNICAL FIELD

The present invention relates to an automobile body structure in which a side sill and a roof side rail are connected by a center pillar.

BACKGROUND ART

An arrangement in which a linking member, which is an aluminum casting, is fixed so as to sandwich from above a vehicle width direction inner face and a vehicle width direction outer face of a side sill, which is made of a CFRP, and an upper part of the linking member is inserted into and fixed to a lower part of a center pillar, which is made of a CFRP and has a hollow closed cross-section, to thus minimize deformation of a vehicle compartment when the vehicle is involved in a side collision is known from Patent Document 1 below.

RELATED ART DOCUMENTS

Patent Documents

Patent Document 1: Japanese Patent Application Laid-open No. 2013-193637

SUMMARY OF THE INVENTION

Problems to be Solved by the Invention

However, with regard to the arrangement described in Patent Document 1 above, when the collision load of a side collision is inputted into the center pillar, which is made of a CFRP, above the linking member, which is an aluminum casting, the compressive load and the tensile load acting on the inner wall in the vehicle width direction and the outer wall in the vehicle width direction of the center pillar respectively are supported by means of carbon continuous fibers aligned in the vertical direction, a front wall and a rear wall of the center pillar undergo out of plane deformation so as to expand in the fore-and-aft direction, the load cannot be supported efficiently by means of the carbon continuous fibers, and there is a possibility that the center pillar will be locally destroyed.

The present invention has been accomplished in light of the above circumstances, and it is an object thereof to achieve a balance between lightness of weight and strength of a center pillar for connecting a side sill and a roof side rail.

Means for Solving the Problems

In order to attain the above object, according to a first aspect of the present invention, there is provided an automobile body structure in which a side sill and a roof side rail are connected by a center pillar, wherein at least part of the center pillar is formed from a pair of CFRP laminates that oppose each other on an inside and an outside in a vehicle width direction and a plurality of metal plates that join the pair of CFRP laminates in the vehicle width direction so as to form a closed cross-section.

Further, according to a second aspect of the present invention, in addition to the first aspect, the metal plate has a squared U-shaped cross section or crank-shaped cross section comprising at inner and outer ends in the vehicle width direction a pair of joining flanges joined to the pair of CFRP laminates.

Furthermore, according to a third aspect of the present invention, in addition to the first or second aspect, the metal plate comprises a bead extending in a vertical direction.

Moreover, according to a fourth aspect of the present invention, in addition to any one of the first to third aspects, the center pillar has a rectangular cross section that is long in a fore-and-aft direction, and at least three metal plates are arranged side by side in the fore-and-aft direction.

Further, according to a fifth aspect of the present invention, in addition to any one of the first to fourth aspects, a metal hollow beam is disposed between the side sill and a lower end of the center pillar, an upper end of the metal hollow beam and the lower end of the center pillar being joined by an intermediate joint.

Furthermore, according to a sixth aspect of the present invention, in addition to the fifth aspect, the side sill is provided in an outer end part in the vehicle width direction of a vehicle body floor made of a CFRP, and a lower end of the metal hollow beam is fixed to an upper end of a center pillar support bracket holding an upper face of the side sill and a lower face of the vehicle body floor from the outside in the vehicle width direction.

Moreover, according to a seventh aspect of the present invention, in addition to the sixth aspect, fitting the center pillar support bracket from an outside in the vehicle width direction into a recess portion formed in the vehicle body floor at the outer end in the vehicle width direction aligns the vehicle width direction outer end of the vehicle body floor and the vehicle width direction outer end of the center pillar support bracket so as to be flush.

Further, according to an eighth aspect of the present invention, in addition to the seventh aspect, the vehicle body floor comprises a projecting portion in which the recess portion is formed, and the center pillar support bracket comprises a hollow projecting portion that is aligned with the projecting portion in the fore-and-aft direction.

Furthermore, according to a ninth aspect of the present invention, in addition to any one of the first to eighth aspects, the pair of left and right center pillars and a roof arch that connects the upper ends thereof in the vehicle width direction are formed as a unit from a CFRP.

It should be noted here that a center pillar lower 55 of an embodiment corresponds to the metal hollow beam of the present invention.

Effects of the Invention

In accordance with the first aspect of the present invention, since at least part of the center pillar connecting the side sill and the roof side rail is formed from the pair of CFRP laminates that oppose each other on the inside and the outside in the vehicle width direction and the plurality of metal plates that join the pair of CFRP laminates in the vehicle width direction so as to form a closed cross-section, a compressive load and a tensile load acting on the vehicle width direction inner face and the vehicle width direction outer face of the center pillar when the collision load of a side collision is inputted can be supported by carbon fibers of the pair of CFRP laminates, and out of plane deformation of the front face and the rear face of the center pillar, which is difficult to support with the CFRP laminate, can be prevented by the metal plate, thereby making it possible to achieve a balance between lightness of weight and strength of the center pillar.

Furthermore, in accordance with the second aspect of the present invention, since the metal plate has a squared U-shaped cross section or crank-shaped cross section including at inner and outer ends in the vehicle width direction the pair of joining flanges joined to the pair of CFRP laminates, not only is the strength of the metal plate enhanced by the joining flanges, but it is also possible to strongly join the CFRP laminates and the metal plate, thus enhancing the strength of the center pillar.

Moreover, in accordance with the third aspect of the present invention, since the metal plate includes the bead extending in the vertical direction, it is possible to suppress out of plane deformation of the metal plate due to the collision load of a side collision effectively.

Furthermore, in accordance with the fourth aspect of the present invention, since the center pillar has a rectangular cross section that is long in the fore-and-aft direction, and at least three metal plates are arranged side by side in the fore-and-aft direction, it is possible by reducing the size of the metal plates, which undergo out of plane deformation due to the collision load of a side collision and increasing the number of metal plates to further enhance the strength of the center pillar.

Moreover, in accordance with the fifth aspect of the present invention, since the metal hollow beam is disposed between the lower end of the center pillar and the side sill, and the upper end of the metal hollow beam and the lower end of the center pillar are joined by the intermediate joint, the metal hollow beam, which has ductility, can be stretched and deformed by the collision load of a side collision, thus absorbing the collision energy.

Furthermore, in accordance with the sixth aspect of the present invention, since the side sill is provided in the outer end part in the vehicle width direction of the vehicle body floor made of a CFRP, and the lower end of the metal hollow beam is fixed to the upper end of the center pillar support bracket holding the upper face of the side sill and the lower face of the vehicle body floor from the outside in the vehicle width direction, not only can the center pillar support bracket be supported strongly by both the vehicle body floor and the side sill, but also degradation of strength does not occur since it is unnecessary to change the cross-sectional shape of the side sill and, moreover, it is possible by means of the center pillar support bracket to prevent the side sill from collapsing inward in the vehicle width direction due to the collision load of a side collision.

Moreover, in accordance with the seventh aspect of the present invention, since fitting the center pillar support bracket from the outside in the vehicle width direction into the recess portion formed in the vehicle body floor at the outer end in the vehicle width direction aligns the vehicle width direction outer end of the vehicle body floor and the vehicle width direction outer end of the center pillar support bracket so that they are flush, it is possible to maintain the ease of design of the vehicle body by aligning the vehicle width direction outer end of the vehicle body floor with the vehicle width direction outer end of the center pillar support bracket.

Furthermore, in accordance with the eighth aspect of the present invention, since the vehicle body floor includes the projecting portion in which the recess portion is formed, and the center pillar support bracket includes the hollow projecting portion that is aligned with the projecting portion in the fore-and-aft direction, the projecting portion of the vehicle body floor and the projecting portion of the center pillar support bracket crumple to thus absorb collision energy.

Moreover, in accordance with the ninth aspect of the present invention, since the pair of left and right center pillars and the roof arch, which connects the upper ends thereof in the vehicle width direction, are formed as a unit from a CFRP, it is possible for the center pillars and the roof arch to enhance the strength of each other and for the number of components to be reduced to thus enhance the productivity.

EXPLANATION OF REFERENCE NUMERALS AND SYMBOLS

11 Vehicle body floor
11$c$ Projecting portion
11$j$ Recess portion
12 Side sill
15 Center pillar
16$b$ Roof side rail
24 Roof arch
53 Center pillar support bracket
53$d$ Projecting portion
55 Center pillar lower (metal hollow beam)
56 CFRP laminate
57 Metal plate
57$b$ Joining flange
57$c$ Bead
58 Intermediate joint

MODE FOR CARRYING OUT THE INVENTION

An embodiment of the present invention is explained below by reference to FIG. 1 to FIG. 6. In the present specification, the fore-and-aft direction, the left-and-right direction (vehicle width direction), and the vertical direction are defined with respect to an occupant seated on a driving seat.

First Embodiment

As shown in FIG. 1 to FIG. 4, an automobile vehicle body frame with a CFRP (carbon fiber-reinforced plastic) as a main material includes a vehicle body floor 11, a pair of left and right side sills 12 and 12 extending in the fore-and-aft direction along left and right side parts of the vehicle body floor 11, a pair of left and right front pillar lowers 13 and 13 rising upward to the front from front ends of the left and right side sills 12 and 12, a pair of left and right rear pillars 14 and 14 rising upward to the rear from rear ends of the left and right side sills 12 and 12, a pair of left and right center pillars 15 and 15 rising upward from intermediate parts in the fore-and-aft direction of the left and right side sills 12 and 12, and a pair of left and right upper members 16 and 16 extending from upper ends of the left and right front pillar lowers 13 and 13 to upper ends of the left and right rear pillars 14 and 14 via upper ends of the left and right center pillars 15 and 15. With regard to the upper member 16, a front half thereof forms a front pillar upper 16a and a rear half part thereof forms a roof side rail 16b. The upper ends of the left and right center pillars 15 and 15 are joined by means of a roof arch 24.

A flat plate-shaped dash panel lower 17 is joined to the front end of the vehicle body floor 11 and front faces of the left and right front pillar lowers 13 and 13, a flat plate-shaped rear partition wall 18 is joined to the rear end of the vehicle body floor 11 and rear faces of the left and right rear pillars 14 and 14, and a rear parcel shelf 19 extends horizontally to the rear from the rear end of the rear partition wall 18. A pair of left and right mounting pedestals 20 and 20, made of an aluminum alloy, are fixed to the front end of the vehicle body floor 11, and rear ends of a pair of left and right front side frames 21 and 21, made of an aluminum alloy, are fixed to front ends of the mounting pedestals 20 and 20.

A pair of left and right rear side frames 22 and 22 extend rearward from the rear end of a lower wall of the vehicle body floor 11, and the rear pillars 14 and 14 and the rear side frames 22 and 22 are joined by means of a pair of left and right rear wheel house inners 23 and 23. The rear end of an upper wall of the vehicle body floor 11 terminates at the position of the rear partition wall 18, a rear floor 44, which is a member separate from the upper wall of the vehicle body floor 11, is disposed to the rear of the rear partition wall 18, and the rear side frames 22 and 22 are formed so as to have a closed cross-section from the rear floor 44 and the lower wall of the vehicle body floor 11 extending further rearward than the rear partition wall 18. A cargo compartment 45 is defined above the rear floor 44.

Figure 1:
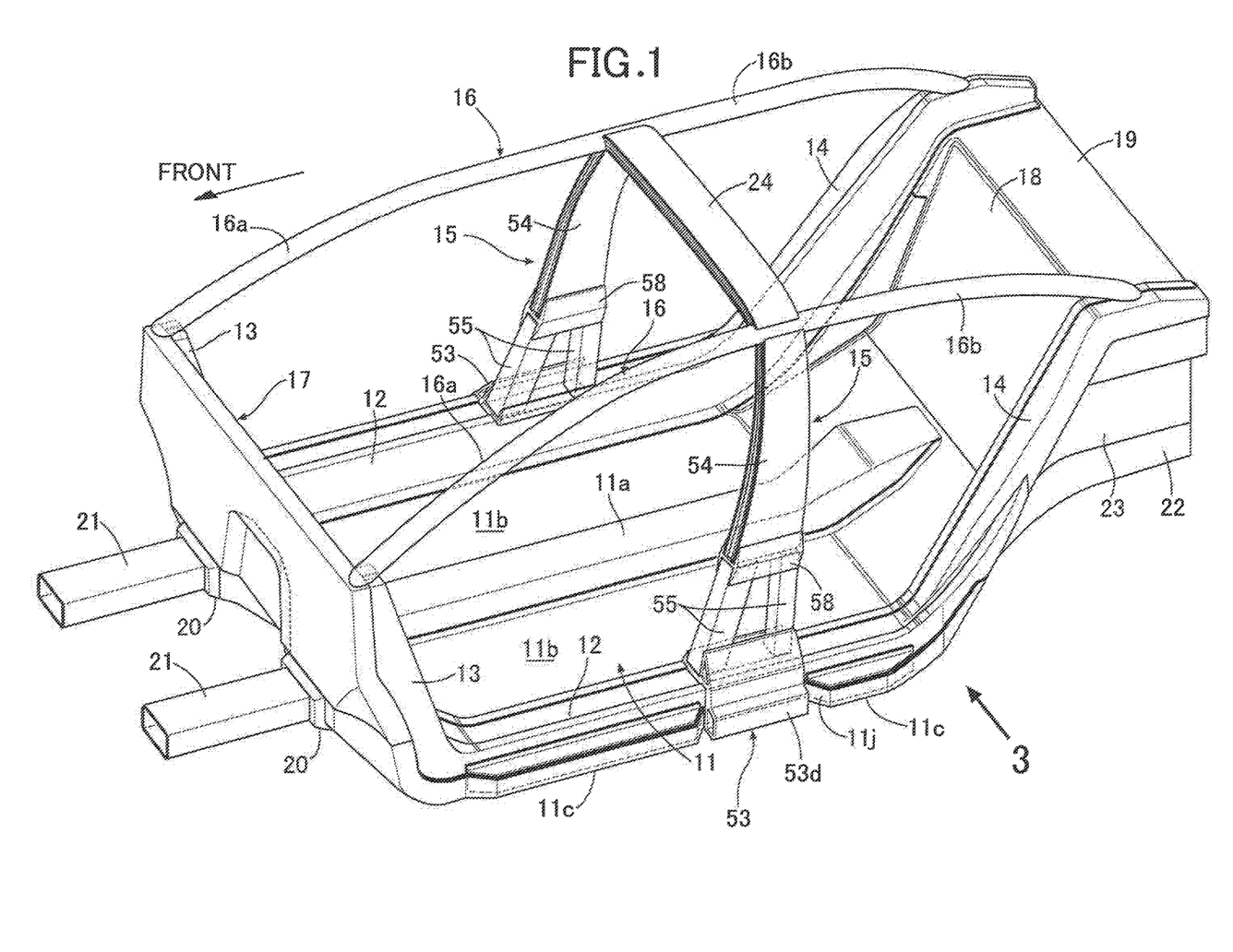
FIG. 1 is a perspective view of an automobile vehicle body frame viewed obliquely from the front. (first embodiment)
Figure 2:
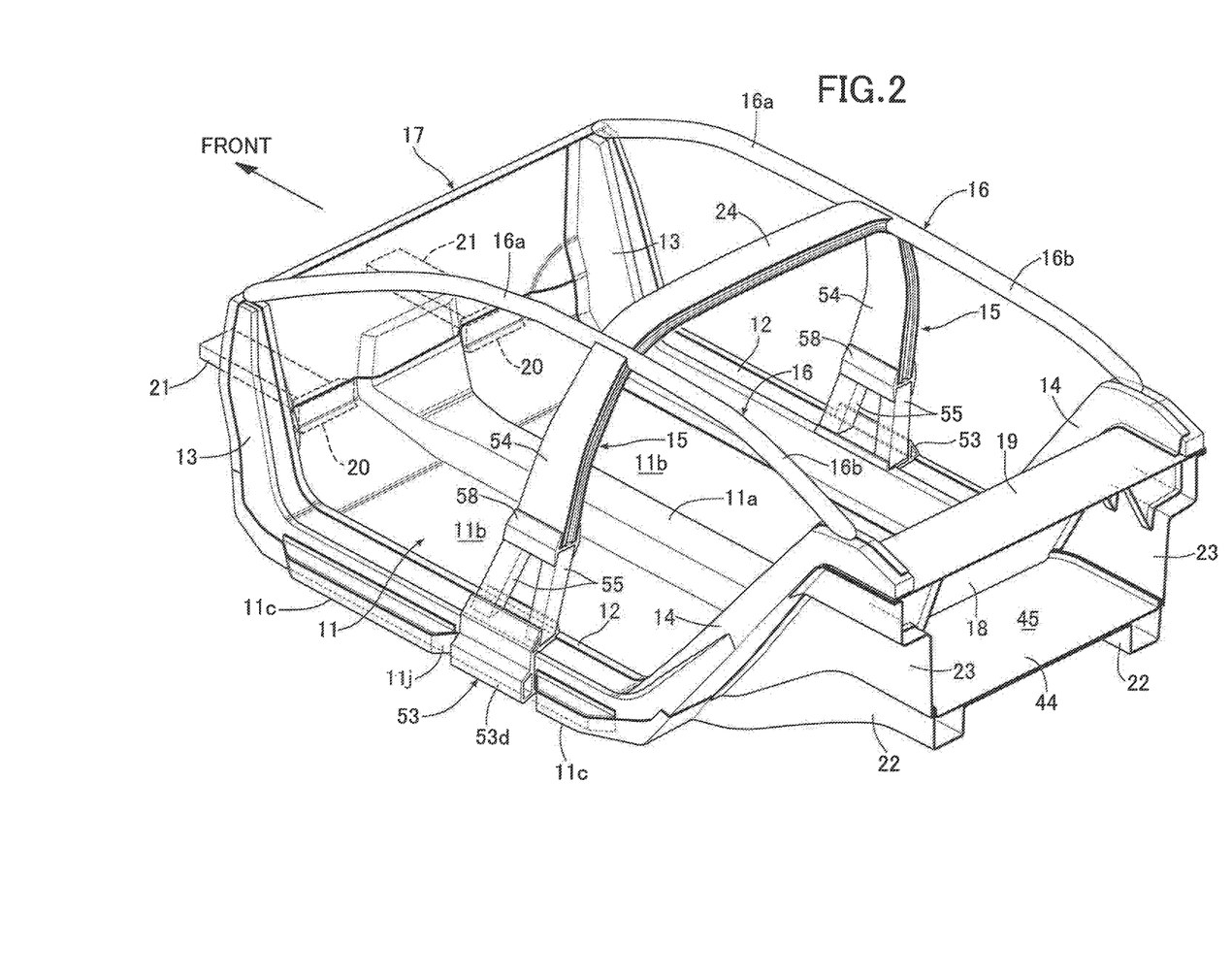
FIG. 2 is a perspective view of the automobile vehicle body frame viewed obliquely from the rear. (first embodiment)
Figure 3:
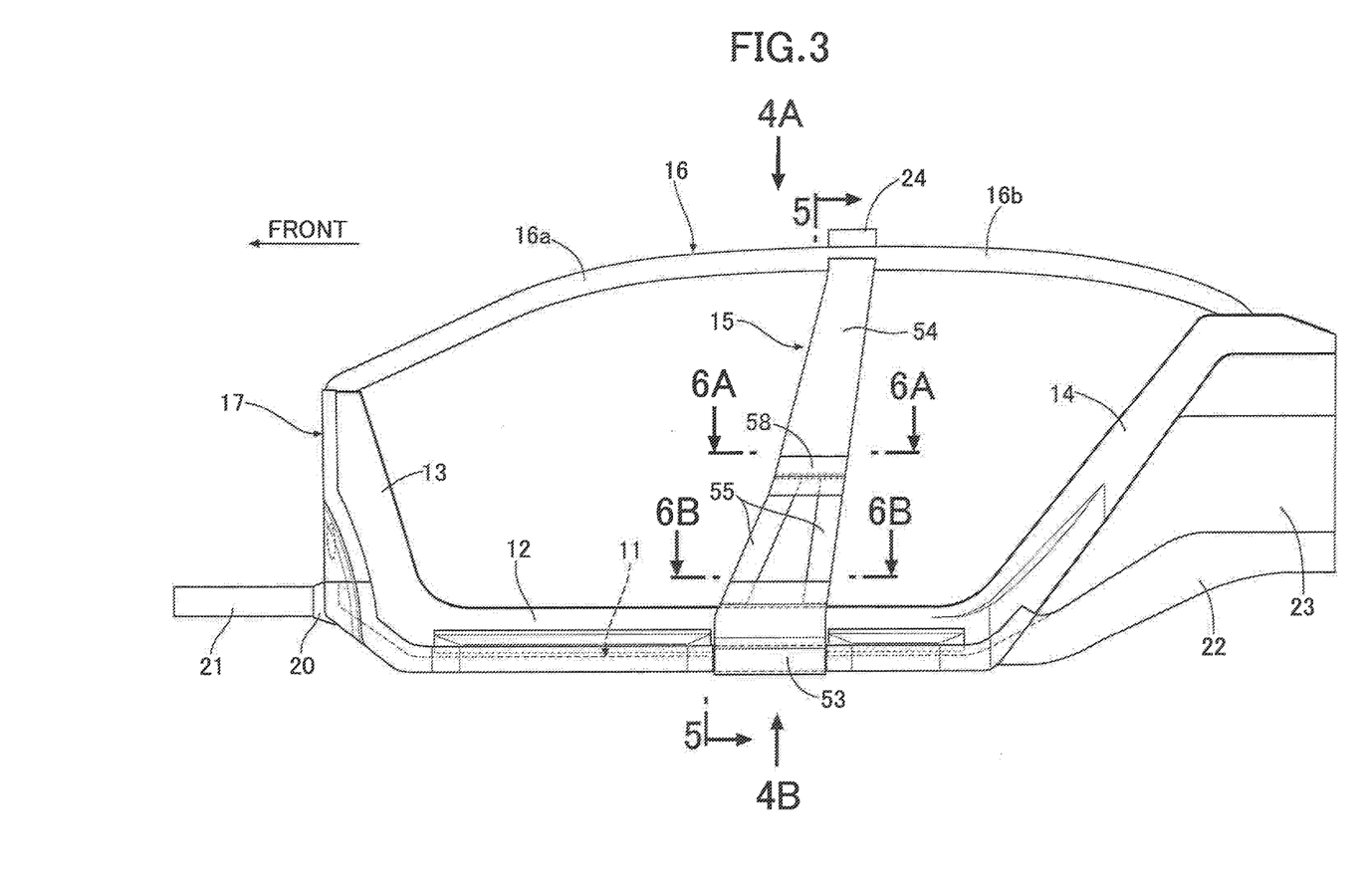
FIG. 3 is a view in the direction of arrow 3 in FIG. 1. (first embodiment)
Figure 4:
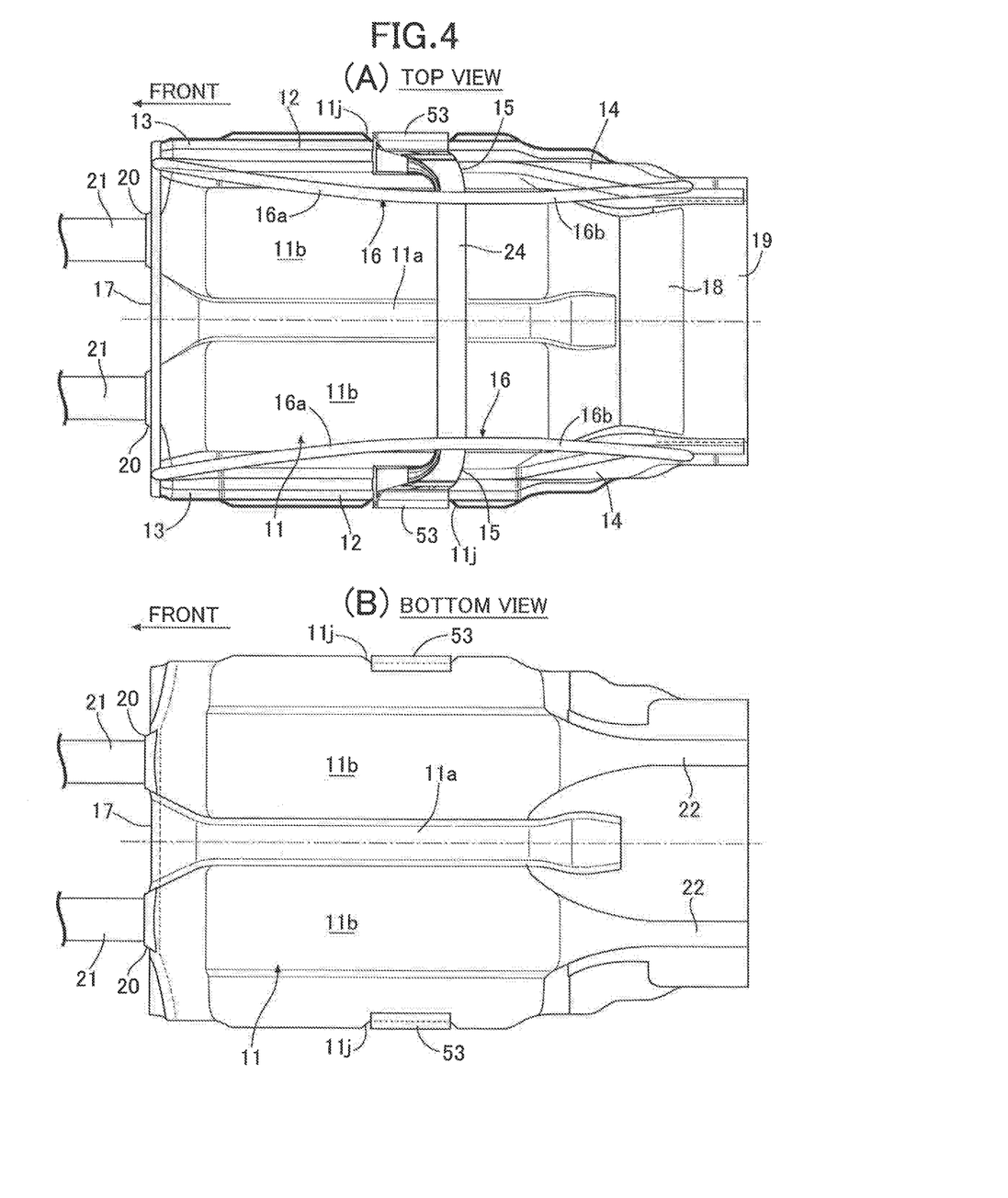
FIG. 4 is a view in the direction of arrow 4A and in the direction of arrow 4B in FIG. 3. (first embodiment)
Figure 5:
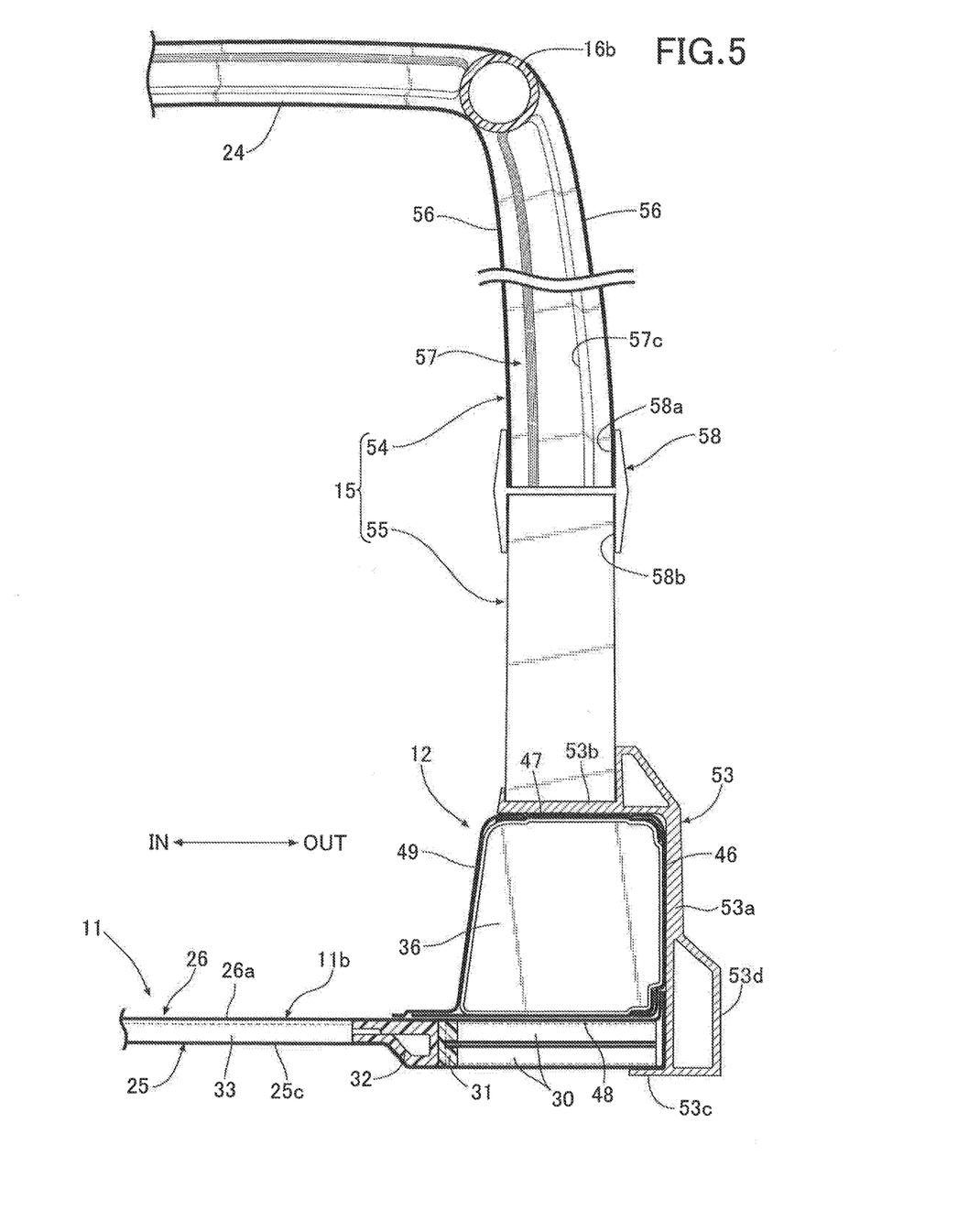
FIG. 5 is a sectional view along line 5-5 in FIG. 3. (first embodiment)

As shown in FIG. 1, FIG. 2, and FIG. 5, the vehicle body floor 11 includes an inverted U-shaped floor tunnel portion 11a that extends in the fore-and-aft direction in a middle part in the vehicle width direction and a pair of left and right floor portions 11b and 11b that are continuous with opposite sides in the vehicle width direction of the floor tunnel portion 11a. With regard to the floor portion 11b, which includes a floor part lower wall 25c of an under floor panel 25 and a floor part upper wall 26a of an upper floor panel 26, opposite end parts in the vehicle width direction are thicker in the vertical direction compared with a middle part in the vehicle width direction, and a pair of upper and lower energy-absorbing members 30 and 30 are disposed on those thick portions. The energy-absorbing members 30 and 30 are formed from a corrugated member made of a PA (polyamide) or a nylon having excellent impact absorption performance.

A support wall 31 is fixed by adhesion to inner sides in the vehicle width direction of the energy-absorbing members 30 and 30, and the energy-absorbing members 30 and 30 are fitted into and joined by adhesion to a fitting groove formed in a vehicle width direction outer face of the support wall 31. Upper faces of the energy-absorbing members 30 and 30 are joined by adhesion to a lower face of the upper floor panel 26, and lower faces of the energy-absorbing members 30 and 30 are joined by adhesion to an upper face of the under floor panel 25.

A load-dispersing frame 32, made of a CFRP (or made of an aluminum alloy), extending in the fore-and-aft direction is disposed in a portion that is inside in the vehicle width direction of the support wall 31 and where the thickness of the floor portion 11b changes. An upper face and a lower face of the load-dispersing frame 32 are joined by adhesion to the lower face of the upper floor panel 26 and the upper face of the under floor panel 25 respectively, and a vehicle width direction outer face is joined by adhesion to a vehicle width direction inner face of the support wall 31. A corrugated core 33 is disposed in the interior of the floor portion 11b on the inside in the vehicle width direction of the load-dispersing frame 32, and an upper face and a lower face of the corrugated core 33 are joined by adhesion to the lower face of the upper floor panel 26 and the upper face of the under floor panel 25 respectively.

The side sill 12 is formed into a square closed cross-section while including an outer side wall 46, an upper wall 47, a lower wall 48, and an inner side wall 49, and a plurality of partition wall plates 36 are disposed in the interior thereof at predetermined intervals in the fore-and-aft direction. The lower wall 48 of the side sill 12 is placed on and joined by adhesion to an upper face of the upper floor panel 26 in a vehicle width direction outer end part of the vehicle body floor 11, that is, upper parts of the energy-absorbing members 30 and 30, and a projecting portion 11c formed at the vehicle width direction outer end of the vehicle body floor 11 projects further outside in the vehicle width direction than the vehicle width direction outer end of the side sill 12.

A recess portion 11j is formed by partially cutting out an intermediate part in the fore-and-aft direction of the projecting portion 11c of the vehicle body floor 11, and a center pillar support bracket 53 formed from an aluminum alloy extruded material is fitted into the recess portion 11j from the outer side in the vehicle width direction. The center pillar support bracket 53 is a squared U-shaped member that has a square cross-section opening on the inside in the vehicle width direction while having a side wall 53a, an upper wall 53b, and a lower wall 53c; the side wall 53a abuts against the outer side wall 46 of the side sill 12 and the recess portion 11j of the vehicle body floor 11, the upper wall 53b abuts against the upper wall 47 of the side sill 12, and the lower wall 53c abuts against a lower face of the vehicle body floor 11, thereby being fixed so as to hold the side sill 12 and the vehicle body floor 11 from above and below. In this state, a hollow projecting portion 53d projecting from the side wall 53a outward in the vehicle width direction aligns with the projecting portion 11c of the vehicle body floor 11 in the fore-and-aft direction. The lower end of the center pillar 15 is joined to an upper face of the upper wall 53b.

As shown in FIG. 1, FIG. 2, FIG. 5, and FIG. 6, the center pillar 15 includes a center pillar upper 54 and a center pillar lower 55, and the pair of left and right center pillar uppers 54 and 54 and the roof arch 24 are formed as a unit so as to form an inverted U-shape when viewed from the front. The center pillar upper 54 is formed from a pair of flat CFRP laminates 56 and 56 disposed on the inside and the outside in the vehicle width direction so as to oppose each other, and four metal plates 57, made of an aluminum alloy, connecting the pair of CFRP laminates 56 and 56. The metal plate 57 includes joining flanges 57b and 57b formed by bending vehicle width direction opposite end parts of a main body portion 57a, which is orthogonal to the CFRP laminates 56 and 56, and adhering the joining flanges 57b of the four metal plates 57 to mutually opposing faces of the pair of CFRP laminates 56 and 56 forms a rectangular closed cross-section that is short in the vehicle width direction and long in the fore-and-aft direction. A bead 57c extending in the vertical direction is formed on the main body portion 57a of the metal plate 57.

Figure 6:
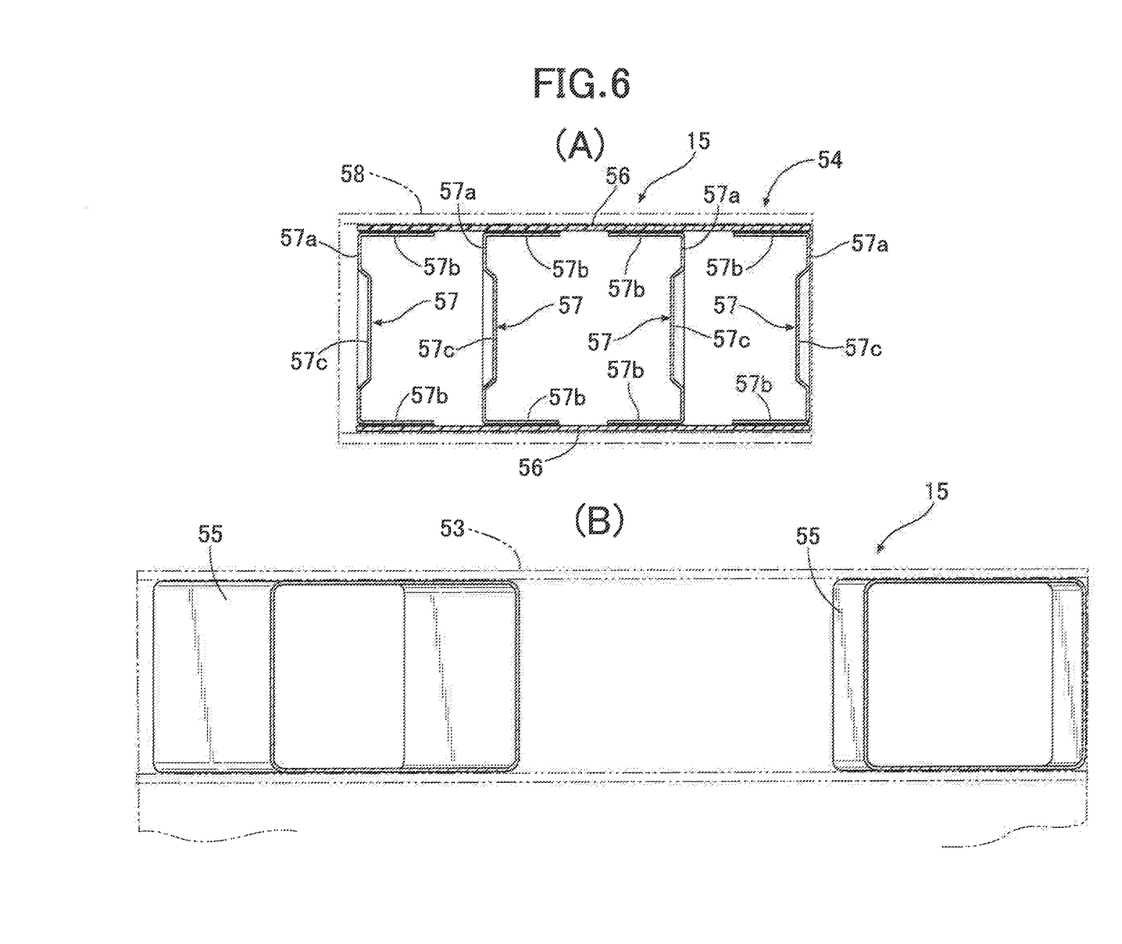
FIG. 6 is a sectional view along line 6A-6A and line 6B-6B in FIG. 3. (first embodiment)

The center pillar lower 55 is formed from two metal hollow beams, made of an aluminum alloy, having a square hollow cross section that is constant in the longitudinal direction, and the lower end thereof is fitted and fixed by adhesion or welding to an upper face of the center pillar support bracket 53. Upper ends of the two metal hollow beams of the center pillar lower 55 disposed in an inverted V-shape so that the gap on the upper end side is smaller than the gap on the lower end side are joined to the lower end of the center pillar upper 54 via an intermediate joint 58 formed from an aluminum alloy extruded material. The intermediate joint 58 is an H-shaped cross section member having grooves 58a and 58b formed in upper and lower parts, the upper ends of the two metal hollow beams of the center pillar lower 55 are fitted into and fixed by adhesion or welding to the groove 58b on the lower side, and the lower end of the center pillar upper 54 is fitted into and fixed by adhesion to the groove 58a on the upper side.

The operation of the embodiment of the present invention having the above arrangement is now explained.

When the collision load of a side collision is inputted into vehicle width direction outer end parts of the vehicle body floor 11 and the side sill 12, the energy-absorbing members 30 and 30 disposed in the interior of the vehicle body floor 11 and the partition wall plates 36 disposed in the interior of the side sill 12 crumple to thus absorb part of the collision energy, and collision energy that cannot be absorbed there is absorbed by being transmitted to the floor portion 11b of the vehicle body floor 11 via the load-dispersing frame 32.

Since the vehicle body floor 11 and the side sill 12 are held from above and below by means of the upper wall 53b and the lower wall 53c of the metal center pillar support bracket 53 fitted into the recess portion 11j formed by cutting out part of the projecting portion 11c of the vehicle body floor 11, it is possible to strongly support the center pillar support bracket 53 by means of both the vehicle body floor 11 and the side sill 12 and prevent the side sill 12 from collapsing inside in the vehicle width direction due to the collision load of a side collision by means of the center pillar support bracket 53 and, moreover, since it is not necessary to change the cross-sectional shape of the side sill 12, degradation of its strength does not occur. Furthermore, it is possible to strongly support the center pillar 15 on the side sill 12 while maintaining the ease of design of the vehicle body by preventing the center pillar support bracket 53 from projecting outward in the vehicle width direction from the vehicle body floor 11 and the side sill 12.

Moreover, since the vehicle body floor 11 includes the projecting portion 11c on which the recess portion 11j is formed, and the center pillar support bracket 53 includes the hollow projecting portion 53d, which is aligned with the projecting portion 11c of the vehicle body floor 11 in the fore-and-aft direction, collision energy can be absorbed by means of the projecting portion 11c of the vehicle body floor 11 and the projecting portion 53d of the center pillar support bracket 53 crumpling due to the collision load of a side collision.

Since the center pillar upper 54 deforms so as to curve inward in the vehicle width direction due to the collision load of a side collision, a compressive load acts on the CFRP laminate 56 on the outside in the vehicle width direction, and a tensile load acts on the CFRP laminate 56 on the inside in the vehicle width direction, but since the compressive load and the tensile load are supported effectively by carbon continuous fibers aligned in the vertical direction of the two CFRP laminates 56 and 56, the bending strength thereof can be ensured.

Furthermore, when the center pillar upper 54 deforms so that its cross section collapses in the vehicle width direction due to the collision load, since the front wall and the rear wall of the center pillar upper 54 undergo out of plane deformation so that there is expansion in the fore-and-aft direction, if the front wall and the rear wall were formed from a CFRP laminate, there is a possibility that they would be easily destroyed. However, in accordance with the present embodiment, due to the pair of CFRP laminates 56 and 56 of the center pillar upper 54 being joined by means of the metal plates 57, which are highly resistant to out of plane deformation, it is possible to further enhance the bending strength of the center pillar upper 54, thus enabling a balance to be achieved between lightness of weight and strength.

Moreover, since the center pillar upper 54 has a rectangular cross section that is long in the fore-and-aft direction, and four metal plates 57 are arranged side by side in the fore-and-aft direction, it is possible by reducing the dimensions of the metal plates 57, which attempt to undergo out of plane deformation due to the collision load of a side collision, to prevent them from deforming, and it is possible by increasing the number of metal plates 57 to further enhance the strength of the center pillar upper 54.

In particular, since the metal plate 57 has a squared U-shaped cross section including at inner and outer ends in the vehicle width direction the pair of joining flanges 57b and 57b joined to the pair of CFRP laminates 56 and 56, not only is the strength of the metal plate 57 enhanced by means of the joining flanges 57b and 57b, but it is also possible to strongly join the CFRP laminates 56 and 56 and the metal plate 57. Moreover, since the metal plate 57 includes the bead 57c extending in the vertical direction, it is possible to suppress out of plane deformation of the metal plate 57 due to the collision load of a side collision more effectively.

Furthermore, since the center pillar lower 55 formed from a metal hollow beam is disposed between the lower end of the center pillar upper 54 and the center pillar support bracket 53, and the upper end of the center pillar lower 55 and the lower end of the center pillar upper 54 are joined by means of the intermediate joint 58, the metal hollow beam, which has ductility, can be stretched and deformed by the collision load of a side collision, thus absorbing the collision energy.

Moreover, since the pair of left and right center pillar uppers 54 and 54 and the roof arch 24, which connects the upper ends thereof in the vehicle width direction, are formed as a unit from a CFRP, it is possible for the center pillar uppers 54 and 54 and the roof arch 24 to enhance the strength of each other and for the number of components to be reduced to thus enhance the productivity.

An embodiment of the present invention is explained above, but the present invention may be modified in a variety of ways as long as the modifications do not depart from the spirit and scope thereof.

For example, in the embodiment the center pillar 15 is formed from the center pillar upper 54 and the center pillar lower 55, but the center pillar lower 55 can be omitted.

Furthermore, the metal plate 57 of the embodiment has a squared U-shaped cross section, but a crank-shaped cross section (Z-shaped cross section) may be formed by bending the pair of joining flanges 57b and 57b in opposite directions from each other from the main body portion 57a.

Moreover, the number of metal plates 57 is not limited to four as in the embodiment, and it may be two or more in order to form a center pillar upper 54 with a closed cross-section.

The invention claimed is:

1. An automobile body structure in which a side sill and a roof side rail are connected by a center pillar, wherein
at least part of the center pillar is formed from a pair of CFRP laminates that oppose each other on an inside and an outside in a vehicle width direction and a plurality of metal plates that join the pair of CFRP laminates in the vehicle width direction so as to form a closed cross-section.

2. The automobile body structure according to claim 1, wherein the metal plate has a squared U-shaped cross section or crank-shaped cross section comprising at inner and outer ends in the vehicle width direction a pair of joining flanges joined to the pair of CFRP laminates.

3. The automobile body structure according to claim 1, wherein the metal plate comprises a bead extending in a vertical direction.

4. The automobile body structure according to claim 1, wherein the center pillar has a rectangular cross section that is long in a fore-and-aft direction, and at least three metal plates are arranged side by side in the fore-and-aft direction.

5. The automobile body structure according to claim 1, wherein a metal hollow beam is disposed between the side sill and a lower end of the center pillar, an upper end of the metal hollow beam and the lower end of the center pillar being joined by an intermediate joint.

6. The automobile body structure according to claim 5, wherein the side sill is provided in an outer end part in the vehicle width direction of a vehicle body floor made of a CFRP, and a lower end of the metal hollow beam is fixed to an upper end of a center pillar support bracket holding an upper face of the side sill and a lower face of the vehicle body floor from an outside in the vehicle width direction.

7. The automobile body structure according to claim 6, wherein fitting the center pillar support bracket from the outside in the vehicle width direction into a recess portion formed in the vehicle body floor at the outer end in the vehicle width direction aligns the vehicle width direction outer end of the vehicle body floor and the vehicle width direction outer end of the center pillar support bracket so as to be flush.

8. The automobile body structure according to claim 7, wherein the vehicle body floor comprises a projecting portion in which the recess portion is formed, and the center pillar support bracket comprises a hollow projecting portion that is aligned with the projecting portion in the fore-and-aft direction.

9. The automobile body structure according to claim 1, wherein the pair of left and right center pillars and a roof arch that connects the upper ends thereof in the vehicle width direction are formed as a unit from a CFRP.

10. The automobile body structure according to claim 2, wherein the metal plate comprises a bead extending in a vertical direction.

* * * * *